US010787205B2

(12) United States Patent
Driant et al.

(10) Patent No.: US 10,787,205 B2
(45) Date of Patent: Sep. 29, 2020

(54) FENDER FOR A WHEELED VEHICLE

(71) Applicant: BOMBARDIER RECREATIONAL PRODUCTS INC., Valcourt (CA)

(72) Inventors: Thomas Driant, Saint-Denis-de-Brompton (CA); Nicolas Laberge, Magog (CA)

(73) Assignee: BOMBARDIER RECREATIONAL PRODUCTS INC., Valcourt (CA)

( * ) Notice: Subject to any disclaimer, the term of this patent is extended or adjusted under 35 U.S.C. 154(b) by 179 days.

(21) Appl. No.: 16/071,371

(22) PCT Filed: Jan. 23, 2017

(86) PCT No.: PCT/IB2017/050346
§ 371 (c)(1),
(2) Date: Jul. 19, 2018

(87) PCT Pub. No.: WO2017/125904
PCT Pub. Date: Jul. 27, 2017

(65) Prior Publication Data
US 2020/0094884 A1 Mar. 26, 2020

Related U.S. Application Data
(60) Provisional application No. 62/286,236, filed on Jan. 22, 2016.

(51) Int. Cl.
*B62D 25/16* (2006.01)
*B62K 5/01* (2013.01)
(Continued)

(52) U.S. Cl.
CPC .............. *B62D 25/16* (2013.01); *B62K 5/01* (2013.01); *B60R 19/00* (2013.01); *B60R 2019/002* (2013.01); *B62K 2005/001* (2013.01)

(58) Field of Classification Search
CPC .... B62D 25/16; B62K 5/01; B62K 2005/001; B60R 19/00; B60R 2019/002
See application file for complete search history.

(56) References Cited

U.S. PATENT DOCUMENTS 5,171,037 A * 12/1992 Thompson .............. B60R 19/00
108/43
5,816,616 A * 10/1998 Boyd ...................... B60R 3/00
280/847

(Continued)

FOREIGN PATENT DOCUMENTS

CN 86204325 U 5/1987
CN 1363496 A 8/2002
(Continued)

OTHER PUBLICATIONS

Supplementary European Search Report of Corresponding European Application No. 17741171.7, Berlin, dated May 14, 2019, Scheuer, Jurgen.

(Continued)

*Primary Examiner* — Jacob B Meyer
(74) *Attorney, Agent, or Firm* — BCF LLP

(57) ABSTRACT

Disclosed is a vehicle including a frame, a vehicle body, a motor connected to the frame, left and right suspensions, left and right wheels operatively connected to the left and right suspensions, each wheel having a rim and a tire mounted on the rim, both wheels being outside the vehicle body, and left and right fenders. Each fender includes an arcuate outer wall adapted for extending over at least a portion of an upper part of the tire of its corresponding wheel and a side wall having an outer portion extending from an edge of the outer wall, the outer portion covering at least a portion of a sidewall of the tire on a vehicle facing side, and an inner portion extending from the outer portion, the inner portion covering (Continued)

at least a portion of the rim of its corresponding wheel on the vehicle facing side.

18 Claims, 12 Drawing Sheets

(51) Int. Cl.
*B60R 19/00* (2006.01)
*B62K 5/00* (2013.01)

(56) References Cited

U.S. PATENT DOCUMENTS

| | | | |
|---|---|---|---|
| D411,816 S * | 7/1999 | Reynard | D12/96 |
| 6,179,312 B1 * | 1/2001 | Paschke | B60R 3/02 |
| | | | 105/444 |
| 6,354,625 B1 * | 3/2002 | Lambertus | B62D 25/168 |
| | | | 280/154 |
| 6,431,605 B1 | 8/2002 | Miller et al. | |
| 6,439,589 B1 * | 8/2002 | Payne | B60Q 1/305 |
| | | | 280/163 |
| 6,533,323 B1 * | 3/2003 | Weaver | B62D 25/188 |
| | | | 280/154 |
| 6,592,147 B2 * | 7/2003 | Lambertus | B62D 25/168 |
| | | | 280/154 |
| D485,788 S | 1/2004 | Guay et al. | |
| 6,702,329 B1 * | 3/2004 | Nishio | B60R 3/00 |
| | | | 280/163 |
| 6,948,581 B2 | 9/2005 | Fecteau et al. | |
| D536,289 S * | 2/2007 | Basset | D12/184 |
| 7,416,046 B2 | 8/2008 | Aube et al. | |
| 7,431,314 B2 * | 10/2008 | Donaldson | B60B 29/002 |
| | | | 280/47.27 |
| 7,464,781 B2 | 12/2008 | Guay et al. | |
| D584,668 S * | 1/2009 | Raghavendran | D12/184 |
| 7,543,672 B2 | 6/2009 | Codere et al. | |
| 7,543,673 B2 | 6/2009 | Lachapelle et al. | |
| D615,472 S * | 5/2010 | Maher | D12/196 |
| 7,819,412 B2 * | 10/2010 | McPherson | B60R 3/002 |
| | | | 280/163 |
| D641,671 S * | 7/2011 | Reid | D12/181 |
| 8,038,164 B2 * | 10/2011 | Stahl | B60R 3/00 |
| | | | 280/166 |
| 8,086,382 B2 | 12/2011 | Dagenais et al. | |
| 8,162,091 B2 | 4/2012 | Laperle et al. | |
| 8,260,535 B2 | 9/2012 | Dagenais | |
| 8,438,942 B2 | 5/2013 | Wilflinger et al. | |
| D689,794 S * | 9/2013 | Bracy | D12/85 |
| D694,686 S | 12/2013 | Deluy et al. | |
| 9,126,535 B1 * | 9/2015 | Moore | B60R 3/00 |
| 9,162,561 B2 | 10/2015 | Marois et al. | |
| 9,809,261 B2 * | 11/2017 | Emura | B62D 25/16 |
| D822,070 S * | 7/2018 | Jackson | D15/28 |
| 10,124,838 B2 * | 11/2018 | Shibutake | B62D 35/005 |
| 2002/0060451 A1 * | 5/2002 | Lambertus | B62D 25/168 |
| | | | 280/770 |
| 2002/0180174 A1 * | 12/2002 | Johnston | B60R 3/00 |
| | | | 280/164.1 |
| 2003/0221891 A1 | 12/2003 | Fecteau et al. | |
| 2005/0001454 A1 | 1/2005 | Rush et al. | |
| 2005/0046250 A1 | 3/2005 | Renner | |
| 2006/0254842 A1 | 11/2006 | Dagenais et al. | |
| 2007/0256882 A1 | 11/2007 | Bedard et al. | |
| 2008/0023242 A1 | 1/2008 | Lachapelle et al. | |
| 2009/0127814 A1 | 5/2009 | McPherson | |
| 2010/0301580 A1 * | 12/2010 | Stahl | B60R 3/00 |
| | | | 280/166 |
| 2011/0080019 A1 | 4/2011 | Castillo | |
| 2015/0083515 A1 | 3/2015 | Tani et al. | |
| 2015/0274213 A1 | 10/2015 | Rudwal et al. | |
| 2015/0321721 A1 | 11/2015 | Sasaki et al. | |
| 2016/0059912 A1 * | 3/2016 | Fujimoto | B62D 49/0628 |
| | | | 280/755 |
| 2016/0185299 A1 * | 6/2016 | Kawashiri | B60R 1/06 |
| | | | 362/549 |

FOREIGN PATENT DOCUMENTS

| | | | |
|---|---|---|---|
| CN | 2554073 Y | 6/2003 | |
| CN | 205469317 U | 8/2016 | |
| DE | 3214901 A1 | 10/1983 | |
| GB | 310781 A | 4/1929 | |
| GB | 2352693 | 2/2001 | |
| JP | H05112179 | 5/1993 | |
| JP | H05213076 | 8/1993 | |
| JP | 2009067159 A * | 4/2009 | B62D 35/00 |
| WO | 2014201463 A2 | 12/2014 | |
| WO | 2015036983 A2 | 3/2015 | |
| WO | 2015036984 A1 | 3/2015 | |

OTHER PUBLICATIONS

English Abstract of JPH05112179, Retrieved on Nov. 19, 2019; Retrieved from www.worldwide.espacenet.com.
English Abstract of JPH05213076, Retrieved on Nov. 19, 2019; Retrieved from www.worldwide.espacenet.com.
International Search Report of PCT/IB2017/050346; dated May 5, 2017; Shane Thomas.
Dino Dalle Carbonare: "Aero Hunting @ WTAC", Speedhunters, Oct. 24, 2013 (Oct. 24, 2013), Retrieved from the Internet <URL:http://www.speedhunters.com/2013/10/aero-hunting-at-wtac> [retrieved on Apr. 18, 2017].
asme.org, Abstract of publication "Control of Vortex Shedding of Circular Cylinder in Shallow Water Flow Using an Attached Splitter Plate", Journal of Fluids Engineering,vol. 130, Issue 4, Research Paper, Published Apr. 4, 2008, retrieved from http://fluidsengineering.asmedigitalcollection.asme.org/article.aspx?articleid=1478120 on Jul. 19, 2018.
Josh Tons, 1955 Jaguar D-Type, Feb. 15, 2014, retrieved from http://buildraceparty.com/1955-jaguar-d-type/ on Jul. 19, 2018.
Wikipedia, Ferrari F10, last edited on Apr. 27, 2018, retrieved from https://en.wikipedia.org/wiki/Ferrari_F10 on Jul. 19, 2018.
Oppositelock, Wings/Spoilers: You're probably doing it wrong., Jan. 12, 2014, retrieved from https://oppositelock.kinja.com/wings-spoilers-youre-probably-doing-it-wrong-1665312667 on Jul. 19, 2018.
English Abstract of DE3214901A1 retrieved from https://worldwide.espacenet.com/ on Jul. 19, 2018.
English Translation of Chinese Office Action from Corresponding Chinese Application No. 201780007561.6; dated Dec. 25, 2019; Huang, Gongan.
English Abstract of CN2554073; Retrieved from www.worldwide.espacenet.com.
English Abstract of CN86204325; Retrieved from www.worldwide.espacenet.com.
English Abstract of CN205469317; Retrieved from www.worldwide.espacenet.com.
English Abstract of CN1363496; Retrieved from www.worldwide.espacenet.com.

* cited by examiner

FENDER FOR A WHEELED VEHICLE

CROSS-REFERENCE

The present application claims priority to U.S. Patent Application No. 62/286,236 filed on Jan. 22, 2016, the entirety of which is incorporated herein by reference.

TECHNICAL FIELD

The present technology relates to a wheeled vehicle provided with fenders and fenders for a wheeled vehicle.

BACKGROUND

Fenders are often used on vehicles having wheels outside the vehicle body, such as three-wheeled vehicles and motorcycles, to help prevent or reduce the amount of water and debris projected rearward by a rotating wheel. However, one of the disadvantages of fenders is that the fenders are in contact with the incoming air when the vehicle is in movement and the fenders may act as "air scoops", thus creating drag.

Additionally, such vehicles having wheels outside the vehicle body are prone to aerodynamic drag due to air circulation through the open wheels, especially three-wheeled vehicles where the left and right side wheels may experience an additional cross-flow.

There is therefore a need for a fender with aerodynamic properties for reducing drag for vehicles with wheels outside the vehicle body.

SUMMARY

It is an object of the present to ameliorate at least some of the inconveniences present in the prior art.

According to an aspect of the present technology, there is provided a vehicle comprising a frame, a vehicle body connected to the frame, a motor connected to the frame, a left suspension connected to a left side of the frame, a right suspension connected to a right side of the frame, a left wheel operatively connected to the left suspension, a right wheel operatively connected to the right suspension, each wheel having a rim and a tire mounted on the rim, the left wheel rotating about a left axis of rotation, the right wheel rotating about a right axis of rotation, both wheels being outside the vehicle body, a left fender disposed at least in part laterally between the vehicle body and the left wheel and a right fender disposed at least in part laterally between the vehicle body and the right wheel, each fender comprising an arcuate outer wall adapted for extending over at least a portion of an upper part of the tire of its corresponding wheel, and a side wall having an outer portion extending from an edge of the outer wall, the outer portion extending radially inward of the outer wall, the outer portion covering at least a portion of a sidewall of the tire on a vehicle facing side of its corresponding wheel, and an inner portion extending from the outer portion, the inner portion extending radially inward of the outer portion, the inner portion covering at least a portion of the rim of its corresponding wheel on the vehicle facing side.

In some implementations of the present technology, the inner portion covers a majority of a fender-side portion of the rim of its corresponding wheel on the vehicle facing side, the fender-side portion of the rim being defined between a spindle of the corresponding wheel and the outer portion of the side wall.

In some implementations of the present technology, the inner portion covers a majority of the rim of its corresponding wheel on the vehicle facing side.

In some implementations of the present technology, the inner portion of the side wall of the left fender extends below the left axis of rotation and the inner portion of the side wall of the right fender extends below the right axis of rotation.

In some implementations of the present technology, for each fender, the inner portion of the side wall is substantially circular.

In some implementations of the present technology, for each fender, the outer wall covers at least a portion of a rear part of its corresponding tire.

In some implementations of the present technology, for each fender, the outer and side walls are integral.

In some implementations of the present technology, each fender further comprises a splitter plate extending rearward from the outer wall, the splitter plate being generally vertical.

In some implementations of the present technology, each fender further comprises a lower plate extending rearward from the outer wall, the lower plate being generally horizontal.

In some implementations of the present technology, the lower plate of the left fender further extends laterally rightward from the outer wall of the left fender; and the lower plate of the right fender further extends laterally leftward from the outer wall of the right fender.

In some implementations of the present technology, the vehicle further comprises a left footrest disposed on a left side of the vehicle body; a right footrest disposed on a right side of the vehicle body; and wherein a line drawn from a bottom of the left wheel to the left footrest passes through the lower plate of the left fender; and a line drawn from a bottom of the right wheel to the right footrest passes through the lower plate of the right fender.

In some implementations of the present technology, wherein each fender further comprises a spoiler extending along the outer portion of the side wall.

In some implementations of the present technology, the spoiler forms a rearward extension of the outer portion of the side wall and a rearward extension of the outer wall.

In some implementations of the present technology, each of the left and right suspensions has a suspension arm, the inner portion of the side wall of each fender defines an aperture, and the suspension arm passes through the aperture.

In some implementations of the present technology, each of the left and right suspensions has a first suspension arm and a second suspension arm; the inner portion of the side wall of each fender defines a first aperture disposed above a corresponding one of the left and right axes of rotation and a second aperture disposed below the corresponding one of the left and right axes of rotation; and the first suspension arm passes through the first aperture and the second suspension arm passes through the second aperture.

In some implementations of the present technology, the vehicle further comprises a left steering arm operatively connected to the left spindle; a right steering arm operatively connected to the right spindle; and wherein the inner portion of the side wall of each fender defines a steering aperture disposed in the inner portion of the side wall, and each steering arm passes through the steering aperture of the corresponding fender.

In some implementations of the present technology, the left fender is connected to the left spindle; and the right fender is connected to the right spindle.

In some implementations of the present technology, the side wall of the left fender is connected to the left spindle; and the side wall of the right fender is connected to the right spindle.

According to another aspect of the present technology, there is provided a fender for a vehicle wheel, the wheel having a rim and a tire mounted on the rim, the wheel having a vehicle facing side facing a vehicle when mounted to the vehicle, the fender comprising an arcuate outer wall adapted for extending over at least a portion of an upper part of the tire; and a side wall having an outer portion extending from an edge of the outer wall, the outer portion extending radially inward of the outer wall, the outer portion being generally perpendicular to the outer wall, the outer portion being adapted for covering at least a portion of a sidewall of the tire on the vehicle facing side, and an inner portion extending from the outer portion, the inner portion extending radially inward of the outer portion, the inner portion being adapted for covering at least a portion of the rim on the vehicle facing side.

In some implementations of the present technology, the inner portion is adapted for covering a majority of a fender-side portion of the rim of its corresponding wheel on the vehicle facing side, the fender-side portion of the rim being defined between a spindle of the corresponding wheel and the outer portion of the side wall.

In some implementations of the present technology, the inner portion is adapted for covering a majority of the rim on the vehicle facing side.

In some implementations of the present technology, the inner portion of the side wall describes a first arc; the outer portion of the side wall describes a second arc; and the first arc is greater then the second arc.

In some implementations of the present technology, the first and second arcs are greater than 180 degrees.

In some implementations of the present technology, the inner portion of the side wall is substantially circular.

In some implementations of the present technology, the fender further comprises a splitter plate extending rearward from the outer wall, the splitter plate being generally parallel to the outer portion of the side wall.

In some implementations of the present technology, the splitter plate extends upwards from a lower edge of the outer wall.

In some implementations of the present technology, the fender further comprises a lower plate extending rearward from the outer wall, the lower plate being disposed generally perpendicularly to the splitter plate.

In some implementations of the present technology, the fender further comprises a lower plate extending rearward from the outer wall, the lower plate being generally perpendicular to a vehicle facing side of the outer portion of the side wall.

In some implementations of the present technology, the lower plate further extends laterally outward from the vehicle facing side of the outer portion of the side wall.

In some implementations of the present technology, the fender further comprises a spoiler extending along the outer portion of the side wall.

In some implementations of the present technology, the spoiler forms a rearward extension of the outer portion of the side wall and a rearward extension of the outer wall.

In some implementations of the present technology, the inner portion of the side wall defines at least one aperture adapted for receiving at least one suspension arm therethrough.

In some implementations of the present technology, the inner portion of the side wall defines a first aperture adapted for receiving a first suspension arm therethrough, the first aperture being disposed above an axis of rotation of the wheel when the fender is mounted to the vehicle; and a second aperture adapted for receiving a second suspension arm therethrough, the second aperture being disposed below the axis of rotation of the wheel when the fender is mounted to the vehicle.

In some implementations of the present technology, the fender further comprises a vertical fin extending upward from a top of the outer wall.

In some implementations of the present technology, the fender further comprises at least one indicator light connected to the vertical fin.

In some implementations of the present technology, the outer and side walls are integral.

According to yet another aspect of the present technology, there is provided a fender for a vehicle wheel, the wheel having a rim and a tire mounted on the rim, the wheel having a vehicle facing side facing a vehicle when mounted to the vehicle, the fender comprising an arcuate outer wall adapted for extending over at least a portion of an upper part of the tire; a side wall extending from an edge of the outer wall, the side wall extending radially inward of the outer wall; and a lower plate extending rearward from the outer wall, the lower plate being generally perpendicular to a vehicle facing side of the side wall.

In some implementations of the present technology, the lower plate further extends laterally outward from the vehicle facing side of the side wall.

For purposes of the present application, terms related to spatial orientation when referring to a vehicle and components in relation to the vehicle, such as "forwardly", "rearwardly", "left", "right", "above" and "below", are as they would be understood by a driver of the vehicle, with the vehicle in a straight ahead orientation (i.e. not steered left or right), and in an upright position. When referring to a component alone, terms related to spatial orientation should be taken with respect to the component itself.

Should there be contradictions between the definitions of terms provided in documents incorporated herein by reference and definitions of such terms provided in the present application, the definitions in the present application prevail.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects, and advantages of implementations of the present technology will become apparent from the following description, the accompanying drawings, and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Fenders 100, 200, and 300 will be described below as being disposed on front steerable wheels 30 of a three-wheeled vehicle 10. However it is contemplated that the fenders 100, 200, and 300 could be disposed on rear wheels, on non-steerable wheels, and/or on vehicle having two, four, or more wheels.

Figure 1:
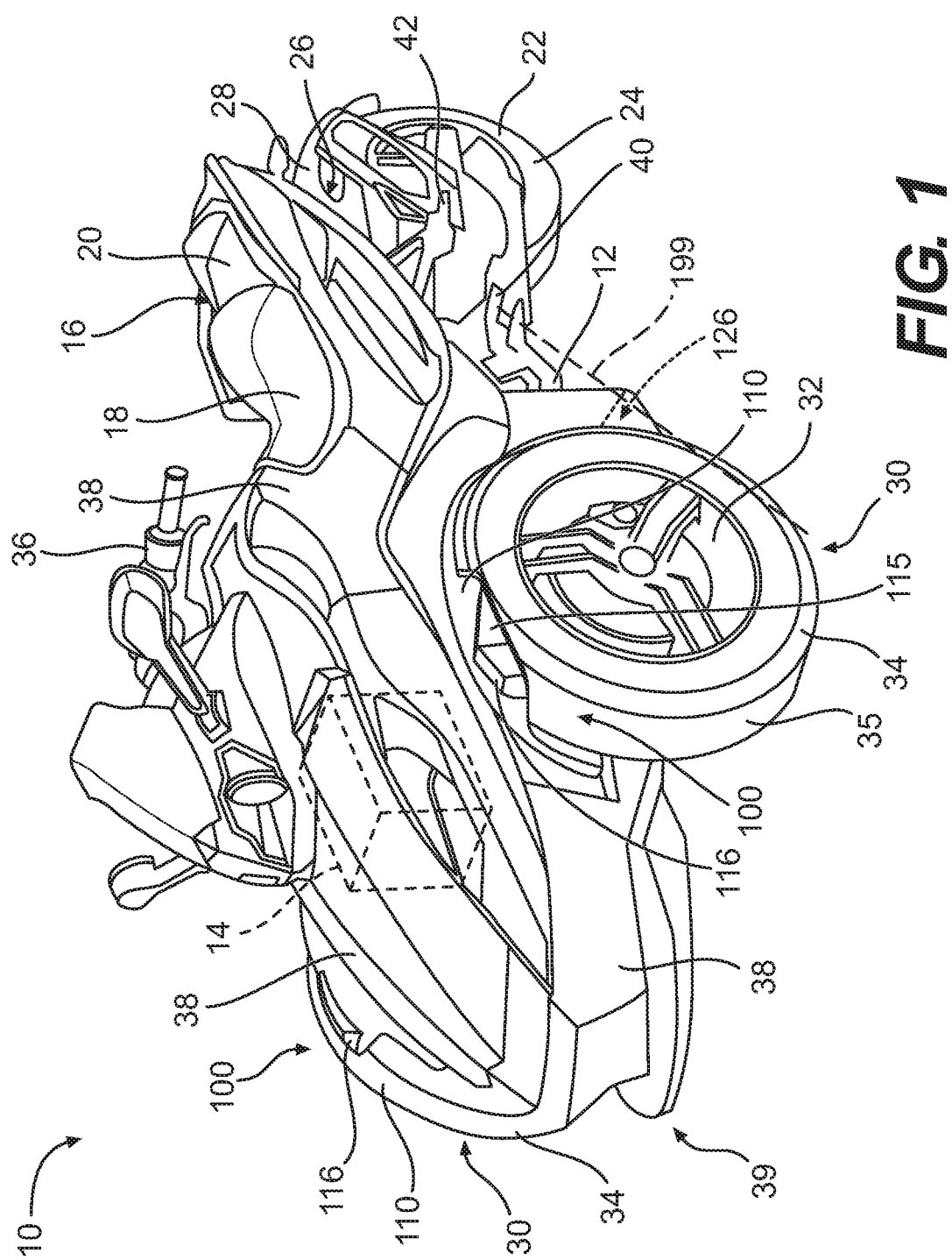
FIG. 1 is a front, left side perspective view of a three-wheeled vehicle.
Figure 2:
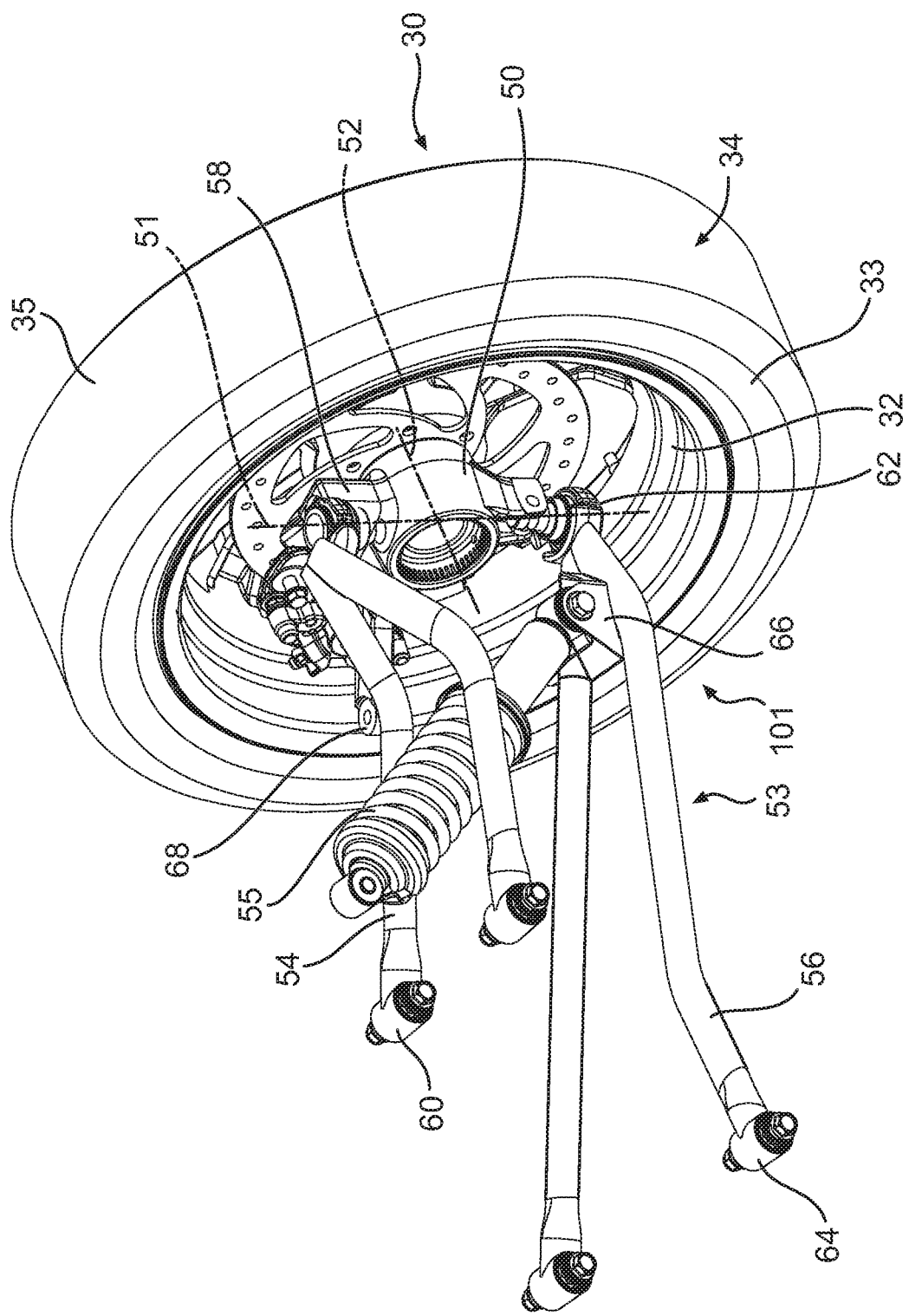
FIG. 2 is a front, right side perspective view of a left wheel and left suspension of the vehicle of FIG. 1, the fender having been removed, the right wheel and suspension being a minor image of the left.

As can be seen in FIG. 1, the vehicle 10 includes a frame 12 that supports a motor 14 (schematically shown). The motor 14 could be any type of suitable power source such as, but not limited to, an electric motor, an internal combustion engine, or a hybrid system. A straddle seat 16 is mounted on the frame 12 and has a driver seat portion 18 and a passenger seat portion 20 disposed behind the driver seat portion 18. A single rear wheel 22 with a tire 24 suitable for road use is suspended via a rear suspension 26 at the rear of the frame 12 and is operatively connected to the motor 14 through a transmission (not shown) including a gearbox and belt drive, although any suitable power transmission mechanism (e.g. continuously-variable transmission, chain drive, driveshaft assembly, etc.) could be used. A rear fender 28 is disposed on the rear wheel 22. A pair of front wheels 30 (referred to herein as left wheel 30 and right wheel 30) is suspended from a front of the frame 12 through a pair of double A-arm suspensions 53 (see FIGS. 2 and 3), which will be described in greater detail below. The front wheels 30 have rims 32 which operatively connect the wheels 30 to the suspension 53. The wheels 30 have tires 34 suitable for road use mounted on the rims 32. The tires 34 each have a tread 35 on a road contacting surface and a sidewall 33 extending from the tread 35 to the rim 32. A handlebar 36 is operatively connected to the front wheels 30 to steer the vehicle 10.

Multiple body panels 38 (only some of which have been numbered) are connected to the frame 12 to form a vehicle body 39 and house therein various components of the vehicle 10 such as the motor 14. As can be seen in FIG. 1, the front wheels 30 and the fenders 100 are outside and laterally spaced from the vehicle body 39.

Foot rests 40, 42 are connected to each side of the frame 12 below the straddle seat 16 and rearward of the front wheels 30. The foot rests 40, 42, which are foot pegs 40, 42, receive the feet of the driver and passenger thereon. It is contemplated that the foot rests 40, 42 could be footboards or any other suitable element capable of supporting the driver's and passenger's feet.

The vehicle 10 includes two front fenders 100: a right fender 100 disposed, at least in part, laterally between the vehicle body 39 and the right wheel 30 and a left fender 100 disposed, at least in part, laterally between the vehicle body 39 and the left wheel 30. The fenders 100 will be described in greater detail below.

Turning now to FIGS. 2 to 5, the manner in which the front left wheel 30 is connected to the frame 12 will be described. Each fender 100 is connected to a spindle 50 of its corresponding wheel. The front right wheel 30 is connected in the same manner and for simplicity its connection to the frame 12 will not be described.

The wheel 30 is connected to the frame 12 on a vehicle facing side 101 (the right side 101 of the left wheel 30). The axle (not shown) of the wheel 30 is received inside bearings (not shown) housed in the spindle 50. The axle defines the rotation axis 52 of the wheel 30. The spindle 50 is located substantially within a cavity formed by the rim 32. The spindle 50 is connected to the frame 12 via the double A-arm suspension 53. The double A-arm suspension 53 includes an upper A-arm 54, a lower A-arm 56, and a shock absorber 55. The upper A-arm 54 is pivotally connected to the top of the spindle 50 at its distal end 58 and to the frame 12 at its proximal end 60. The lower A-arm 56, disposed below the upper A-arm 54, is pivotally connected to the bottom of the spindle 50 at its distal end 62 and to the frame 12 at its proximal end 64. A line 51 passing through the rotation centers of the distal ends 58, 62 of the upper and lower A-arms 54, 56 defines the steering axis 51 of the wheel 30. The lower end of the shock absorber 55 is pivotally connected to a bracket 66 on the lower A-arm 56. The upper end of the shock absorber 55 is pivotally connected to the frame 12 above the proximal end 60 of the upper A-arm 54. It is contemplated that other types of suspensions could be used.

Figure 3:
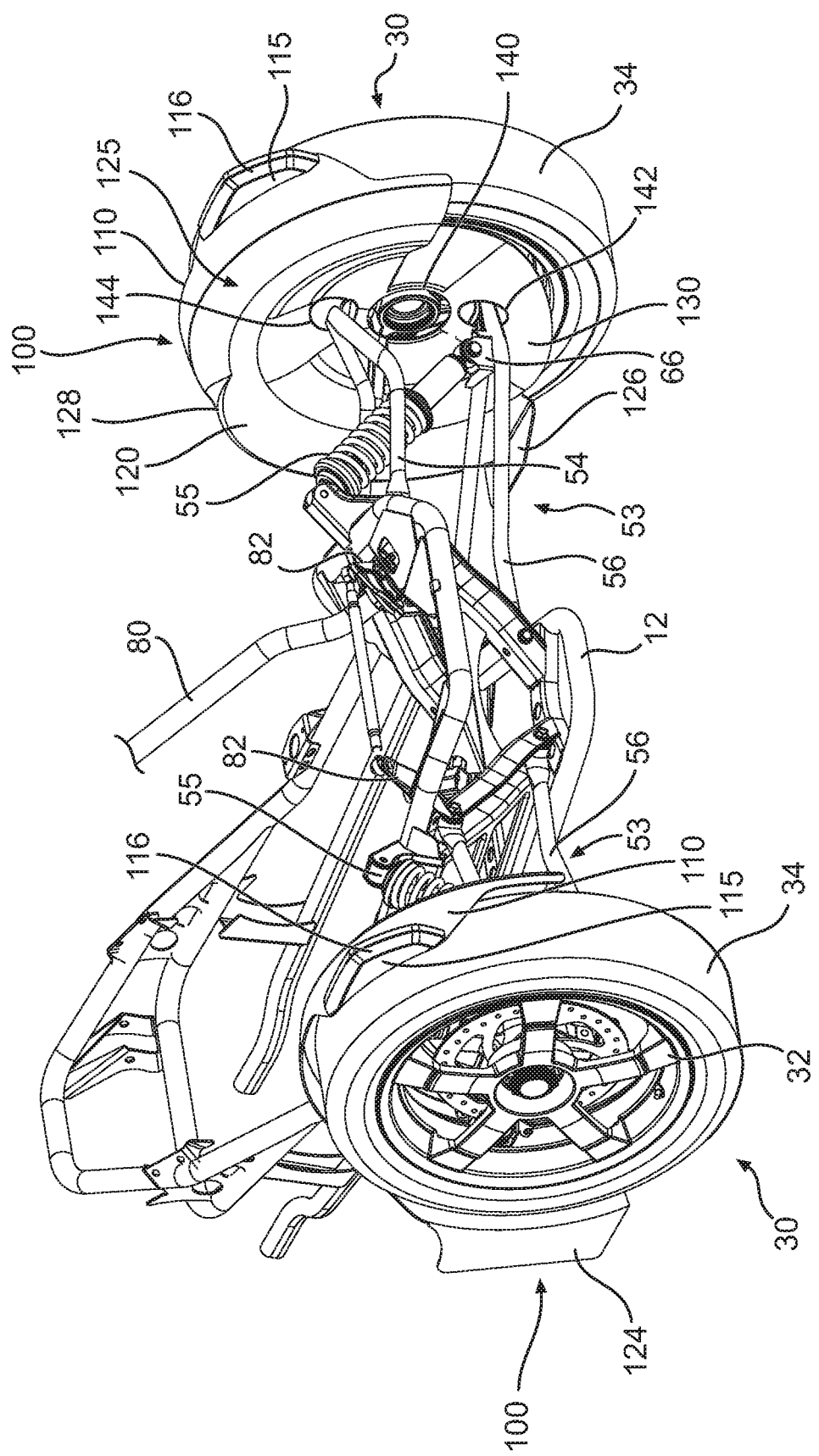
FIG. 3 is a front, right side perspective view of the front wheels, suspensions, fenders and a portion of the frame of the vehicle of FIG. 1.
Figure 4:
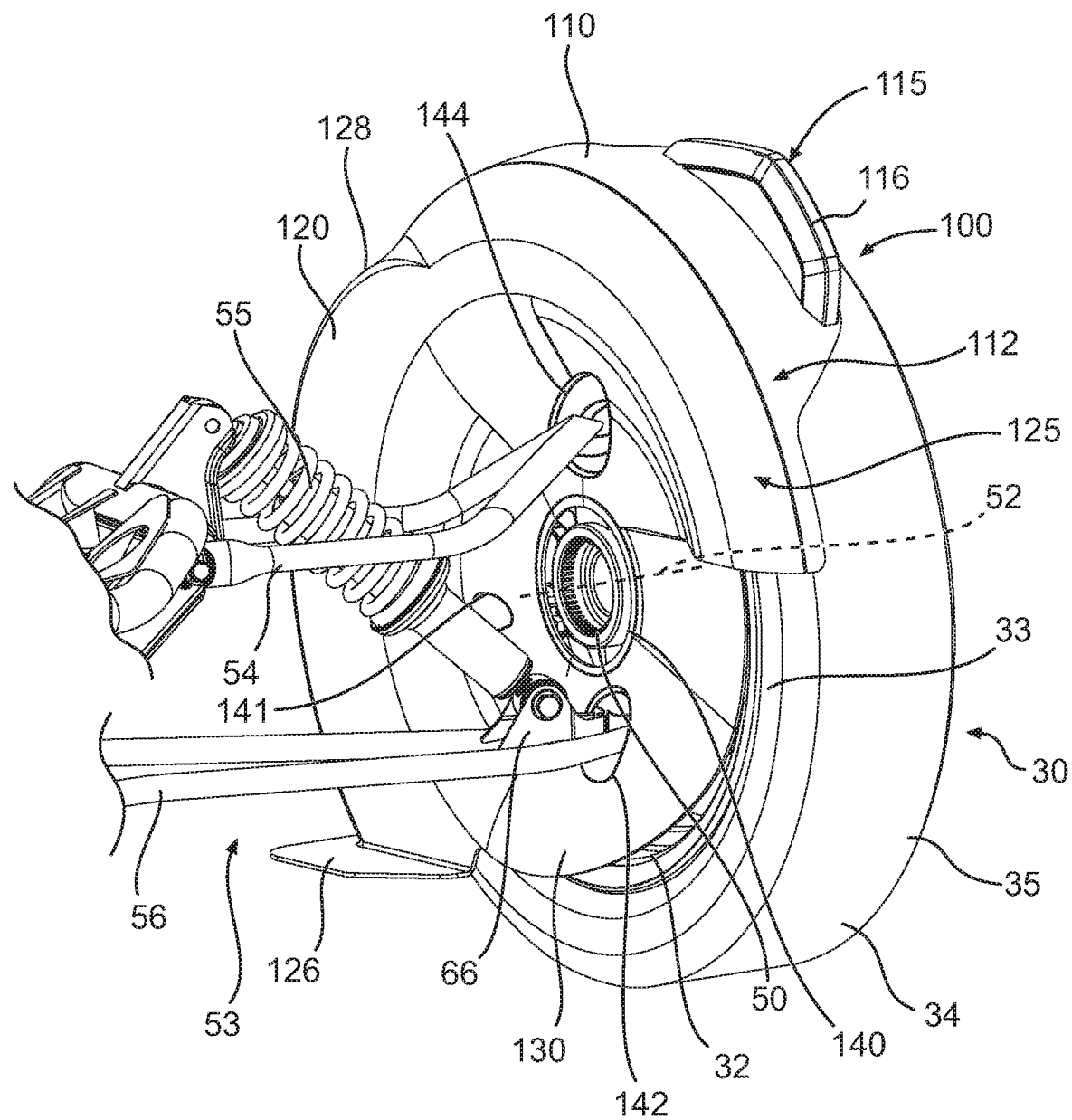
FIG. 4 is a close up of the left fender, suspension, and wheel of FIG. 3.

The spindle 50 defines a steering arm 68 extending rearward and laterally inward. A steering rod (not shown) is pivotally connected at its distal end to the steering arm 68 and at its proximal end to a pitman arm 82. As seen in FIG. 3, the pitman arm 82 is operatively connected to the lower end of a steering column 80. The upper end of the steering column 80 is connected to the handlebar 36. As a result, when the handlebar 36 is turned, the wheel 30 is steered. It is contemplated that other types of steering systems could be used, such as, but not limited to, a rack-and-pinion system. It is also contemplated that the vehicle 10 could be provided with a power steering system.

With additional reference to FIGS. 6 to 10, the left fender 100 will be described. The right fender 100 is a minor image of the left fender 100, and therefore will not be described in detail herein. It is contemplated that in some implementations, the left and right fenders 100 may not be minor images of each other.

The fender 100 has an arcuate outer wall 110 extending over an upper part of the tire 34. Aligned generally perpendicular to the outer wall 110 is a side wall 125 composed of an outer portion 120 and an inner portion 130. The outer portion 120 is located radially outward of the inner portion 130 with respect to the axis 52. By being disposed between the wheel 30 and the vehicle body 39, the side wall 125 covers portions of the vehicle facing side 101 of the wheel 30.

The outer wall 110 extends over portions of upper front and rear parts of the tire 34, covering portions of the tread 35. It is contemplated that the outer wall 110 may cover more or less area over the top of the tire 34. The arcuate form follows the circumferential form of the tire 34 and has a central portion that is flat in a lateral direction. It is contemplated that the outer wall 110 could, however, take different forms depending on the implementation.

Figure 5:
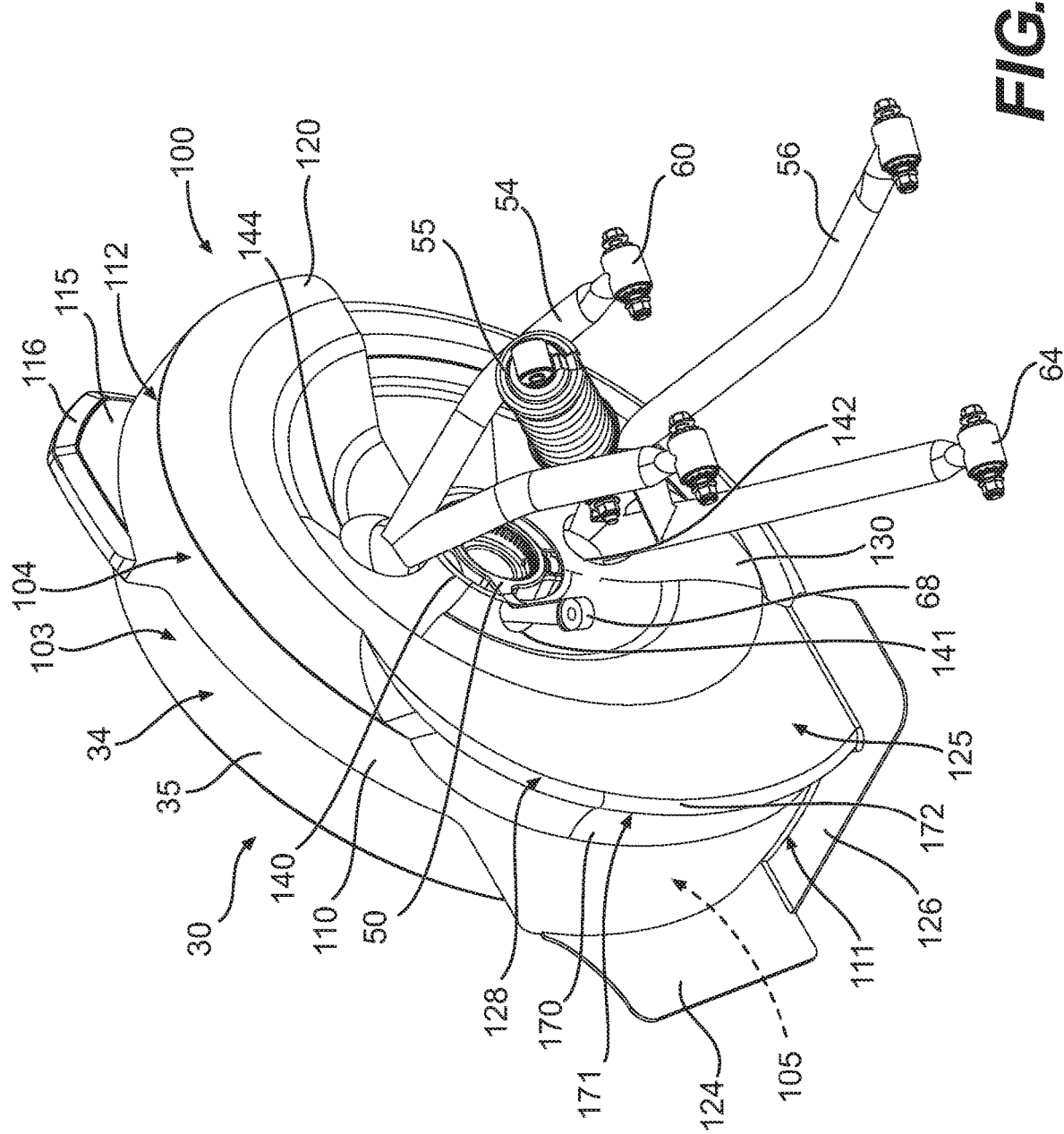
FIG. 5 is a rear, right side perspective view of the left fender, left wheel, and left suspension of the vehicle of FIG. 1.

As seen in FIG. 5, the outer wall 110 also covers a portion of a rear part 105 of the tire 34, the rear part 105 being indicated by dash lines to represent the fact that it is hidden from view by the fender 100. This portion of the outer wall 110 can help reduce splash from the tires 34 from reaching an operator of the vehicle 10. It is contemplated that the outer wall 110 could cover more or less of the rear part 105 of the tire 34, including up to all of the rear part 105.

The outer portion 120 of the side wall 125 extends from a right edge 112 of the outer wall 110 in a generally radially inward direction so as to cover a portion of the sidewall 33 of the tire 34, on the vehicle facing side 101. It is contemplated that the outer portion 120 of the side wall 125 could extend from less than the entire edge 112 of the outer wall 110. It is also contemplated that the outer portion 120 could cover more or less of the sidewall 33 of the tire 34.

The inner portion 130 of the side wall 125 extends from the outer portion 120 in a generally inward direction so as to cover a majority of the rim 32 on the vehicle facing side 101, in part to help disrupt the cross-flow of air and the subsequent drag induced thereby. The inner portion 130 of the side wall 125 is disposed between the spindle 50 and the vehicle body 39. It is contemplated that the inner portion 130 could cover more or less of the rim 34 in different implementations.

As described above, the side wall 125 is generally aligned perpendicularly to the outer wall 110. However, the outer portion 120 and the inner portion 130 of the side wall 125 are slightly laterally offset from one another (see FIG. 4). The inner portion 130 is laterally shifted from the outer portion 120 toward the wheel 30. In addition, the portions 120, 130 of the side wall 125 have some curvature in their overall shape and are not flat in all regions. It is contemplated that the portions 120, 130 could be flatter or more or less curved, depending on the implementation. It is also contemplated that the portions 120, 130 could be more or less laterally offset from one another, including having no lateral offset between the portions 120, 130, and that the outer wall 110 could be more or less curved than as shown in the illustrated implementations.

Figure 6:
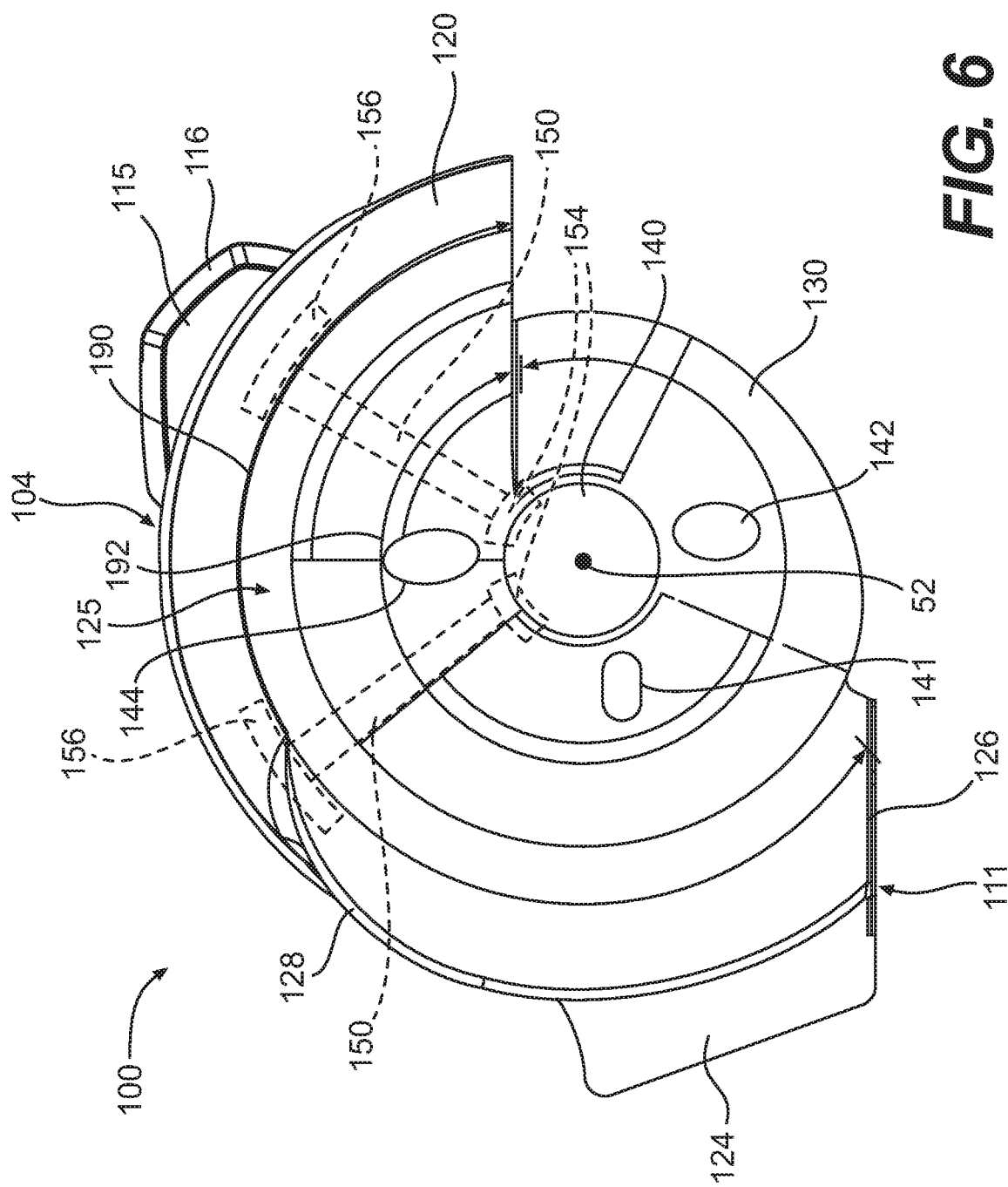
FIG. 6 is a right side elevation view of the left fender of the vehicle of FIG. 1, the right fender being a minor image of the left fender.
Figure 7:
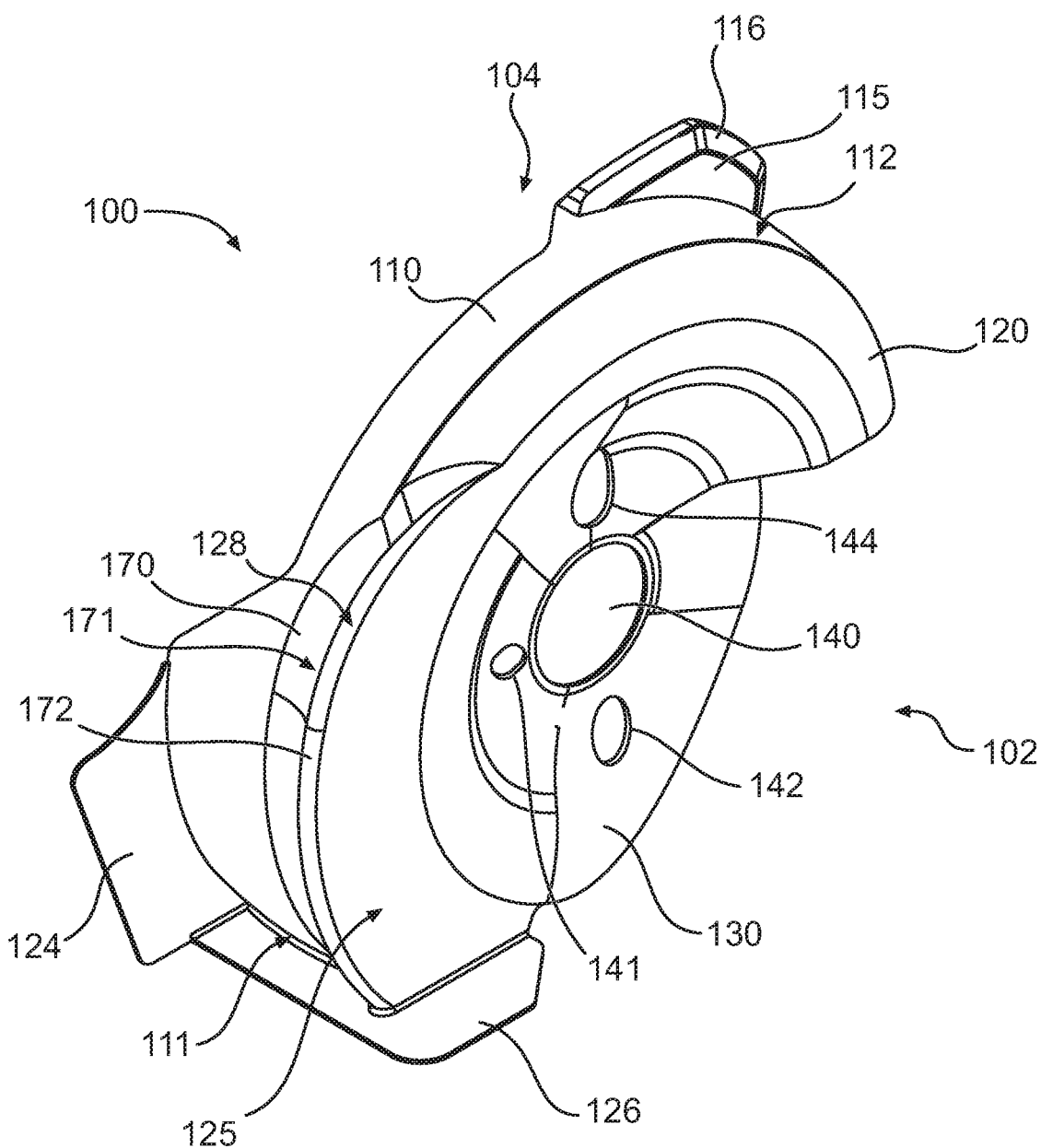
FIG. 7 is rear, right side perspective view of the fender of FIG. 6.
Figure 8:
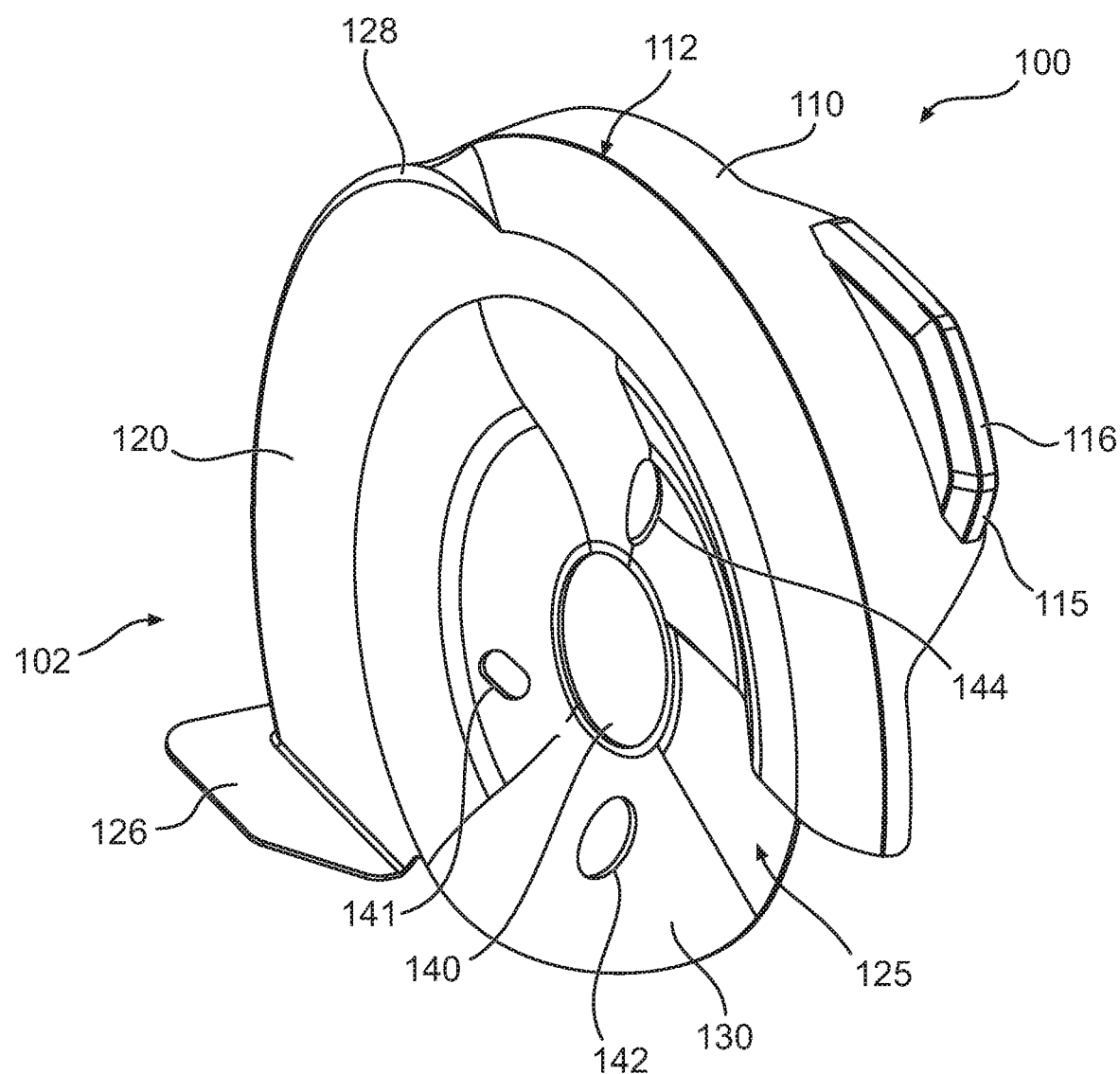
FIG. 8 is a front, right side perspective view of the fender of FIG. 6.
Figure 10:
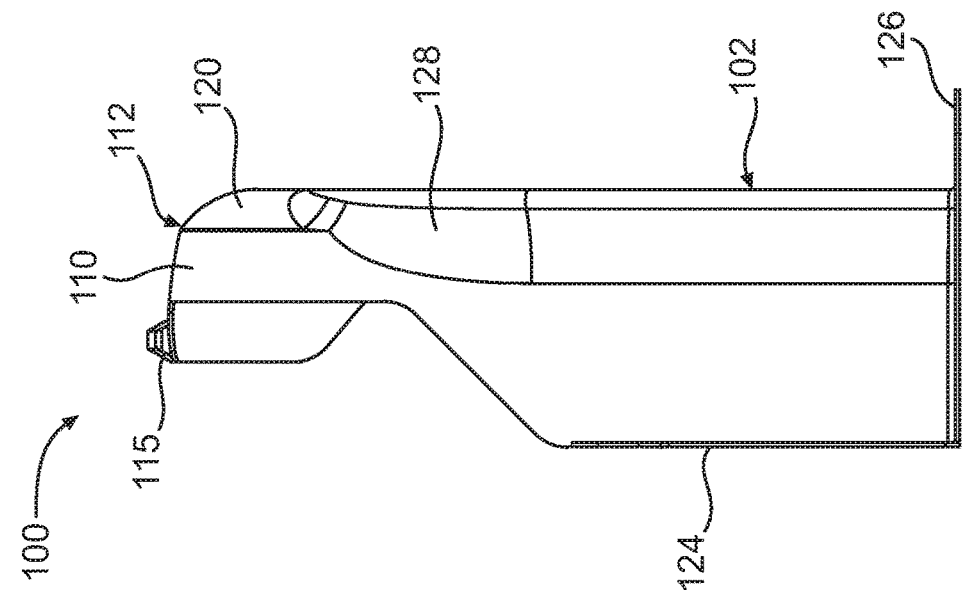
FIG. 10 is a rear elevation view of the fender of FIG. 6.
Figure 9:
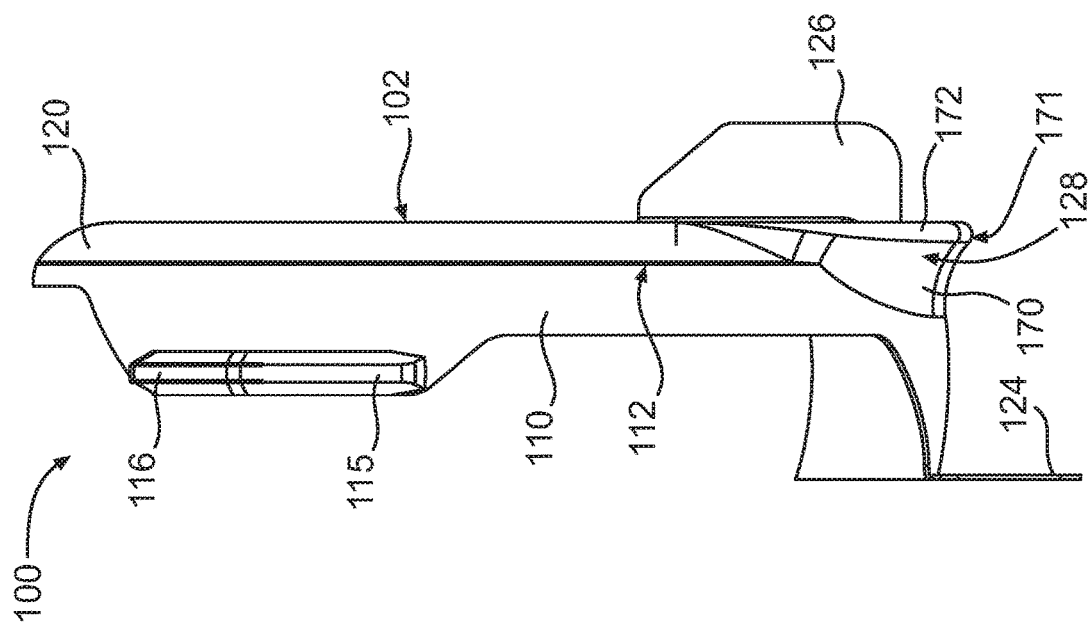
FIG. 9 is a top plan view of the fender of FIG. 6.

With specific reference to FIG. 6, the outer portion 120 spans an angle of approximately 225 degrees about the axis of rotation 52, as described by an arc 190 along a central region of the outer portion 120. The inner portion 130 spans an angle of approximately 360 degrees about the axis of rotation 52, which is described by an arc 192. The arc 192 of the inner portion 130 is larger than the arc 190 of the outer portion 120, although both measure more than 180 degrees. As the arc 192 spans 360 degrees, it surrounds the axis of rotation 52. The inner portion 130 is also substantially circular so as to substantially cover a vehicle facing side of a cavity formed by the rim 32. Being substantially circular around the axis of rotation 52, the inner portion 130 extends below the axis of rotation 52 of the wheel 30. It is contemplated that the arc 192 could span a smaller angle. It is also contemplated that the arc 190 of the outer portion 120 could span a larger or a smaller angle, depending on the implementation.

The inner portion 130 of the side wall 125 defines two apertures for the suspension 53 to connect to the spindle 50. An upper aperture 144, above the axis of rotation 52, allows the upper suspension arm 54 to pass through the fender 100 and connect to the spindle 50, as described above. A lower aperture 142, below the axis of rotation 52, allows the lower suspension arm 56 to pass through the fender 100 and connect to the spindle 50, also described above. Both apertures 142, 144 are oval shaped, elongated in a generally vertical direction, to allow generally unimpeded movement of the suspension arms 56, 54. It is contemplated that the apertures 142, 144 could be circular or any other shape; the shape and dimension of the apertures 142, 144 depend, inter alia, on the size and the range of movement of the suspension arms 56, 54.

The inner portion 130 also defines a steering aperture 141, which allows the steering arm 68 to pass through the fender 100 to the spindle 50. The aperture 141 is sized such that the steering arm 68 can pass through the side wall 125. Contrary to the apertures 142, 144, the steering arm 68 does not pivot with respect to the wheel 30 and the aperture 141 does not need to provide clearance for relative movement between the fender 100 and the steering arm 68. It is contemplated that the steering aperture 141 could be circular or any other shape.

The inner portion 130 of the side wall 125 further defines a spindle aperture 140 such that the fender 100 does not cover a central portion of the rim 32. It is contemplated that the inner portion 130 could define a larger or smaller spindle aperture 140. In some implementations, it is also contemplated that the inner portion 130 could be constructed without any spindle aperture 140. It is further contemplated that the side wall 125 could define other apertures or passages not defined herein, including in the inner portion 130, the outer portion 120 or both of the portions 120, 130. It is further contemplated that the fender 100 could define apertures, such as louvers and the like, specifically for directing air flow through the fender 100.

The fender 100 has two supports 150 for connecting fender 100 to the spindle 50. At an upper end 156, each support 150 is mechanically connected to a tire facing portion of the outer portion 120 of the side wall 125. At a lower end 154, each support 150 connects to the spindle 50. It is contemplated that the supports 150 could instead extend from the spindle 50 and attach to the inner portion 130. It is also contemplated that other configurations of the supports 150 could be implemented, including, but not limited to: the supports 150 being integral to the fender 100, the upper ends 156 of the supports 150 connecting to other portions of the fender 100, and the upper ends 156 being welded to one of the walls 110, 125. It is also contemplated that other mechanisms for connecting the fender 100 to the spindle 50 could be used. It is further contemplated that the fender 100 could connect to a different component of the vehicle 10. Additional details on structures for connecting fenders to wheeled vehicles can be found in United States Patent Publication No. US 2015/0274213 A1, published Oct. 1, 2015, the entirety of which is incorporated herein by reference.

The fender 100 includes a splitter plate 124 for helping to improve aerodynamic properties of the fender 100. More specifically, the splitter plate 124 functions to break a vortex that can form in a recirculation zone behind the wheel 30 when in operation. The splitter plate 124 extends rearward from the outer wall 110, the plate 124 being generally vertical. The splitter plate 124 also extends upwards along the outer wall 110 from a lower edge 111 of the outer wall 110. More specifically, the splitter plate 124 extends rearwardly and upwardly from a rear, bottom, left corner of the outer wall 110. The size and shape of the vortex that will form behind the wheel 30 will depend on many factors, including the size and shape of the wheel 34 and the suspension 54 and the positions of those components relative to the remainder of the vehicle 10, as well as to the speeds at which the vehicle 10 is to be operated. The size and position of the splitter plate 124 are chosen, at least in part, based on the size and shape of the recirculation zone. In the implementations illustrated herein, the splitter plate extends to about the height of the axis of rotation 52 and has a straight, rear edge. For the right fender 100, the splitter plate 124 extends rearwardly and upwardly from a rear, bottom, right corner of the outer wall 110 and has the same dimensions as those of the splitter plate 124 of the left fender 100. As such the splitter plate 124 is generally parallel to the outer portion 120 of the side wall 125. It is contemplated, however, that the splitter plate 124 could extend from other portions of the outer wall 110. It is also contemplated that the splitter plate 124 could be disposed at another angle. It is further contemplated that the splitter plate 124 could be omitted.

The fender 100 also includes a lower plate 126 for helping to reduce splash from the tire 30 toward the driver and the passenger. The lower plate 126 extends rearward from a bottom portion of the outer wall 110 and laterally rightward toward the vehicle body 59 from the outer portion 120 of the side wall 125. For the right fender 100, the lower plate 126 extends rearward from the outer wall 110 and laterally leftward toward the vehicle body 59. It is contemplated that the lower plate 126 could extend only from the outer wall 110 or only from the outer portion 120.

As it extends laterally away from bottom portions of the walls 110, 125, the lower plate 126 is generally horizontal and generally perpendicular to the vehicle facing side 102 of the outer portion 120. It is contemplated, however, that the lower plate 126 could be disposed at an angle other than generally horizontal. It is also contemplated that the lower plate 126 could be omitted, depending on the implementation.

The lower plate 126 is disposed generally perpendicular to the splitter plate 124. The two plates 124, 126 are joined at a rear, lower, left corner of the fender 100, although it is contemplated that the two plates 124, 126 could be separated from one another. It is also contemplated that the lower plate 126 could be disposed at an angle other than perpendicular to the splitter plate 124. It is further contemplated that the plates 124, 126 could be disposed perpendicularly to one another, without either plate 124, 126 being horizontal or vertical.

As seen in FIG. 1, a line 199 drawn from the bottom of the wheel 30 to the footrest 40 passes through the lower plate 126. The lower plate 126 is hidden from view by the splitter plate 124 and as such is indicated with dotted lines. This line 199 represents a flight path that water and debris may follow as they are kicked up by the tires 34, and which may be splashed toward the driver's feet on the footrests 40. As the line 199 passes through the lower plate 126, the water and debris may be at least partially blocked by the lower plate 126. It is contemplated that the lower plate 126 may be larger or smaller depending on details of different implementations, including, but not limited to, the placement of the footrests 40 or the footrests 42 for the passenger.

While the splitter and lower plates 124, 126 are generally thin and planar as illustrated in the figures, this may vary in different implementations. It is contemplated that the plates 124, 126 could be of different forms, including, but not limited to, curved, corrugated, and hyperbolic. It is also contemplated that the plates 124, 126 could have variable thickness on their lengths.

The fender 100 includes a spoiler 128 for further influencing the air flow around the wheel 30. More specifically, the spoiler 128 functions to control the separation of the air flow behind the wheel 30. The spoiler 128 forms a flat, vehicle facing surface 172 that extends along the outer portion 120 of the side wall 125, generally along the rear of the fender 100. The spoiler 128 forms a curved, rearwardly and outwardly facing surface 170 that extends rearwardly and inwardly from the rear of the outer wall 110. The two surfaces 170, 172 of the spoiler 128 meet at an edge 171 that extends upwards from the lower edge 111 to a point above the axis of rotation 52 and is substantially concentric with the axis of rotation 52. It is contemplated that the spoiler 128 could extend along a longer or shorter section of the outer portion 120. It is also contemplated that the shape of the spoiler 128 could vary in many ways, including, but not limited to: in length, thickness, height, shape of its profile, and curvature. It is further contemplated that the spoiler 128 could be strictly ornamental or omitted.

The fender 100 includes a vertical fin 115 extending upwards from a top side 104 of the outer wall 110. There is an indicator light 116 connected to the vertical fin 115. It is contemplated that the vertical fin 115 could include more or fewer indicator lights. It is also contemplated that the vertical fin 115 could include one or more reflectors. It is further contemplated that the reflectors could be in place of, or in addition to, the one or more indicator lights 116.

Figure 11:
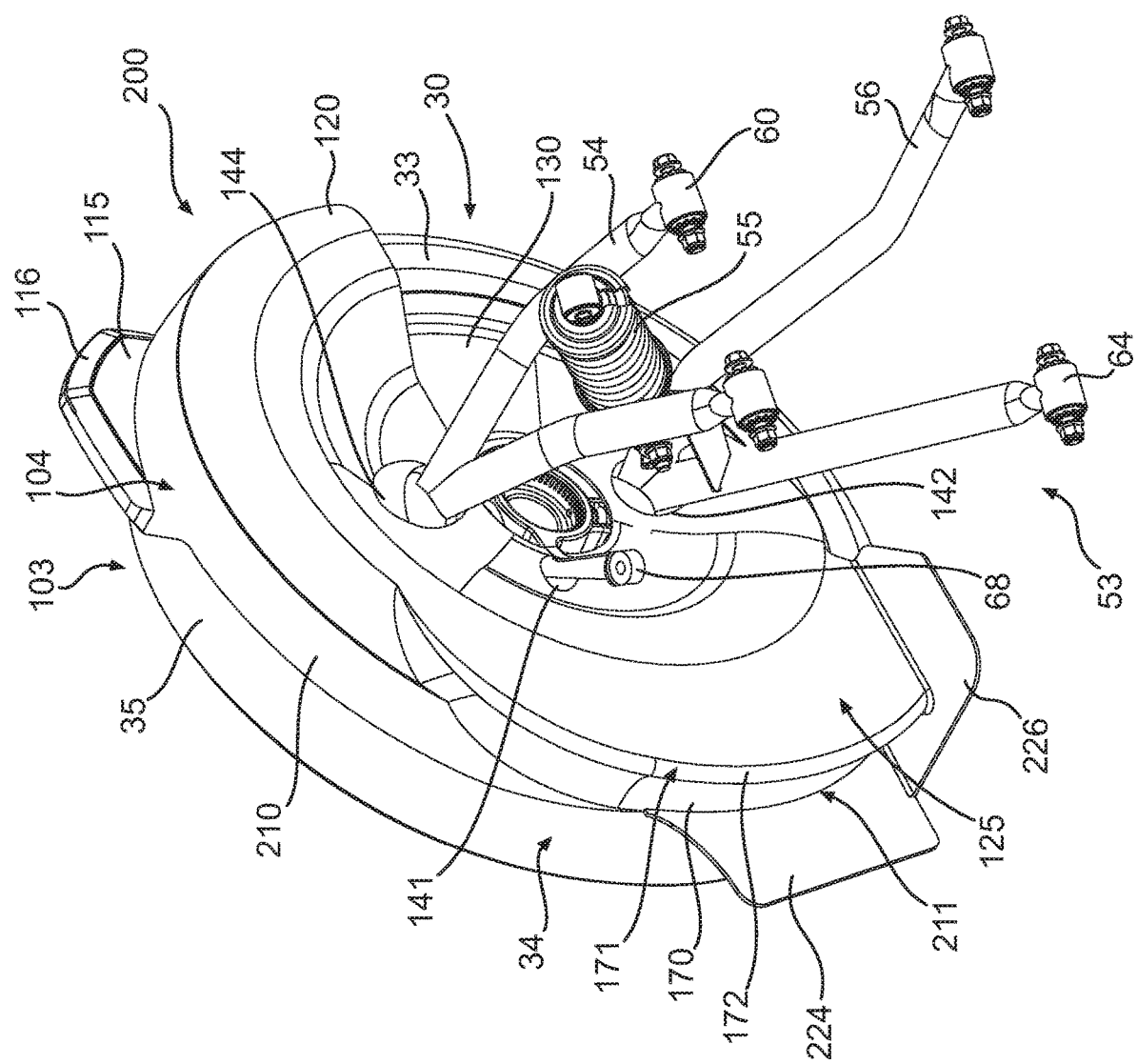
FIG. 11 is a rear, right side perspective view of a left wheel and a left suspension with a left fender according to another implementation.
Figure 12:
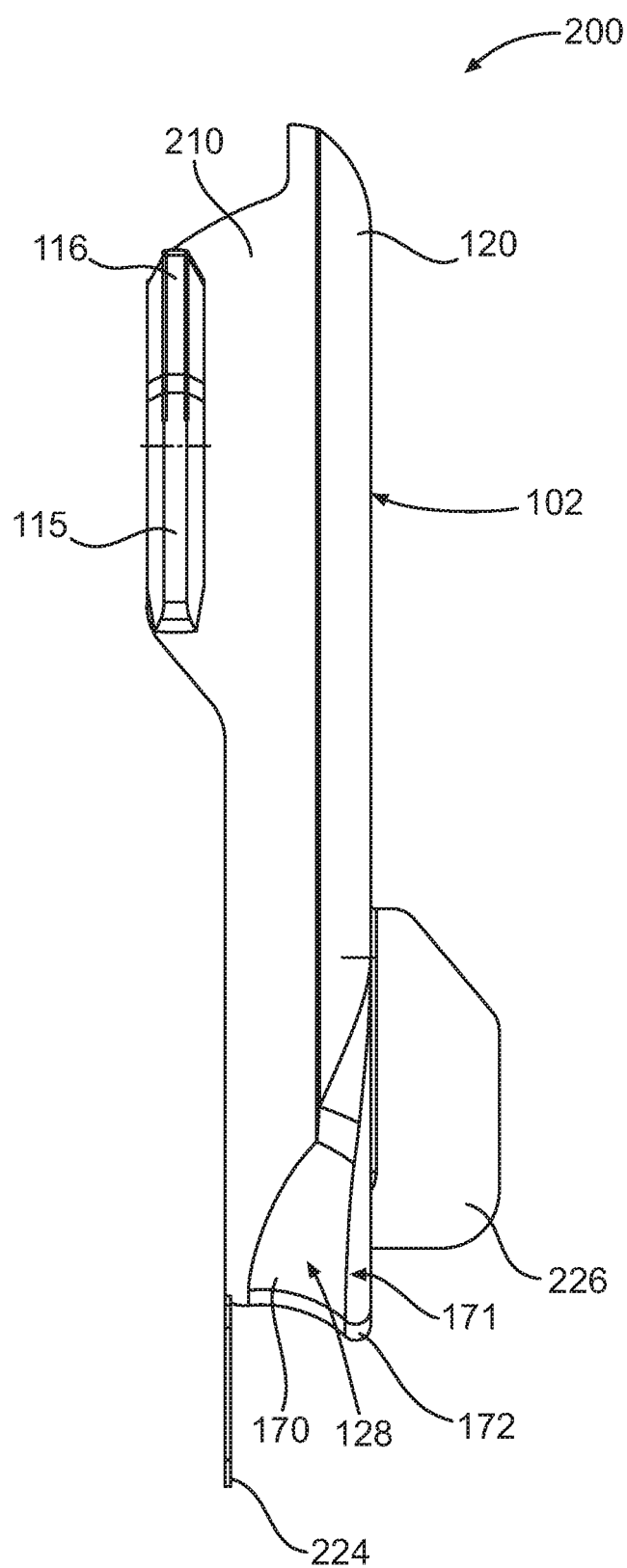
FIG. 12 is a top plan view of the fender of FIG. 11.

Another implementation of a fender 200 is illustrated in FIGS. 11 and 12. Features similar to those in fender 100 retain the same reference numeral and will not be described again.

The fender 200 includes a splitter plate 224 extending from a left edge 211 of the outer wall 210. In this implementation the outer wall 210 extends over the top and rear sides of the tire 34, but covers less of the tread 35 of the tire 34 than the outer wall 110 of the fender 100. The outer wall 210 of fender 200 extends only to a lateral middle portion of the tire 34 and as such the splitter plate 224 is generally aligned with the center of the wheel 30. A lower plate 226 extends rearward from the outer wall 210 and inward (toward the vehicle 10) from the outer portion 120 of the side wall 125. Similarly, the lower plate 226 extends along a smaller portion of the width of the tire 34 than the lower plate 126 of fender 100. It is contemplated, however, that the lower plate 226 could extend outward beyond the edge 211 of the outer wall 210.

The fenders 100 and 200 are made of thin, lightweight material such as, but not limited to, sheet metal, plastic, fiberglass and carbon fiber. However, it is contemplated that the fenders 100 and 200 could be made thicker and of any sufficiently strong material. It is also contemplated that the walls 110, 125, the plates 124, 126, the vertical fin 115, and the spoiler 128 could be integral in some implementations. It is further contemplated that all or some of the walls 110, 125, the plates 124, 126, the vertical fin 115, and the spoiler 128 could be made of different materials.

The outer wall 110 and the inner 120 and outer 130 portions of the side wall 125 are integral. It is contemplated that the walls 110, 125 could be connected, individual components composed of differing or same materials. It is also contemplated that the outer wall 110 and the side wall 125 portions 120, 130 could all be individual connected components composed of different or the same materials. It is further contemplated that the walls 110, 125 could be composed of individual connected components which could be bonded or mechanically connected together.

Figure 13:
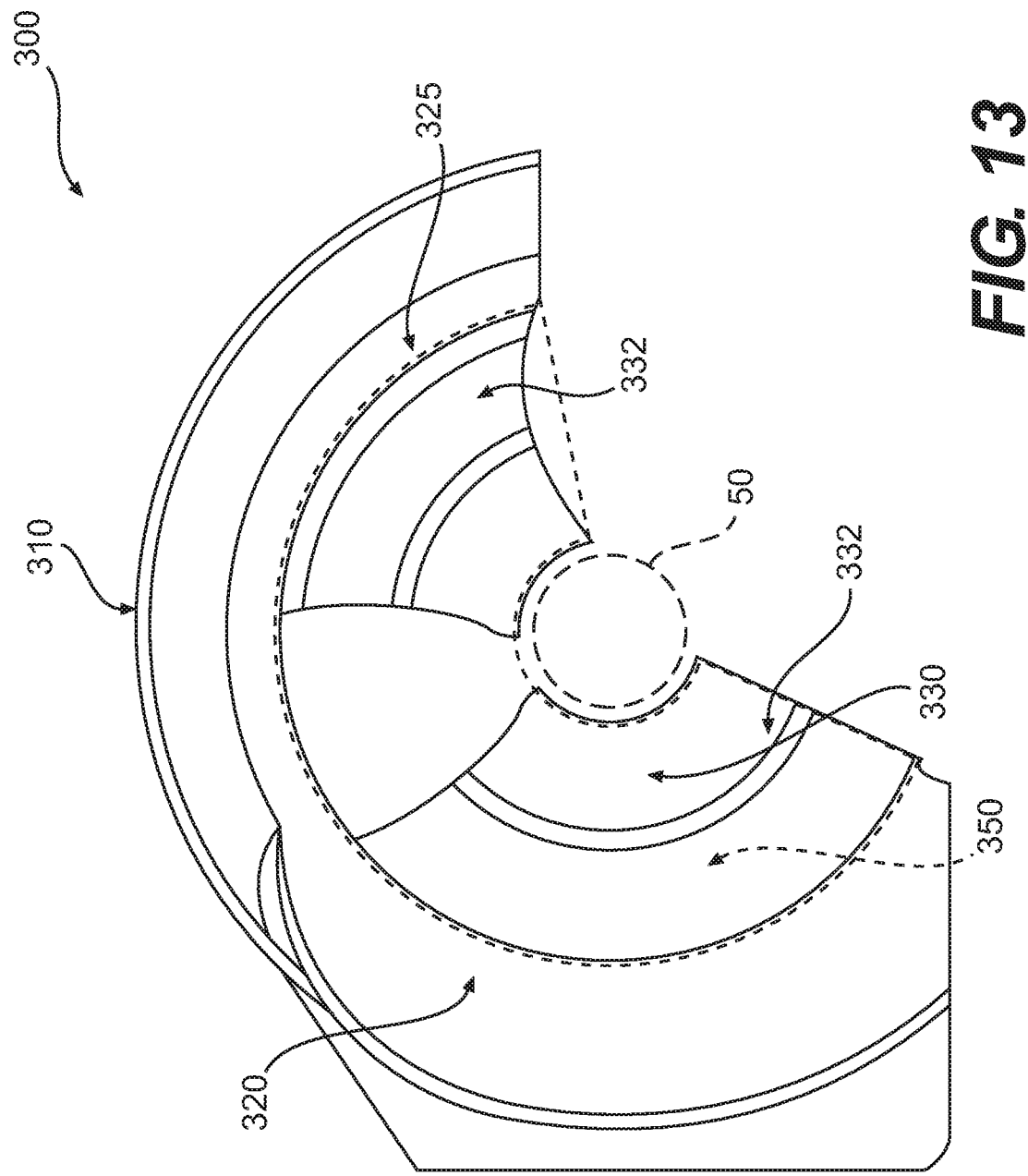
FIG. 13 is a right side elevation view of a left fender according to another implementation.

Another implementation of a fender 300 is illustrated in FIG. 13. The fender 300 has an arcuate outer wall 310 extending over an upper part of the tire 34. Aligned generally perpendicular to the outer wall 310 is a side wall 325 composed of an outer portion 320 and an inner portion 330. In this implementation, the inner portion 330 of the side wall 325 consists of two inner portion sections 332 radially spaced from one another. It is contemplated that the inner portion 330 could include more or less sections 332.

Disposed between the wheel 30 and the vehicle body 39, the side wall 325 covers portions of the vehicle facing side 101 of the wheel 30. Specifically, the inner portions 330 covers a majority of a fender-side portion 350 of the rim 32. As illustrated schematically in FIG. 13, the fender-side portion 350 of the rim 32 is defined between the spindle 50 of the wheel 30 and the outer portion 320 of the side wall 325. The fender-side portion 350 of the rim 32 is a ring sector extending radially from the spindle 50 to the outer portion 320 of the side wall 325, and extending from a front edge 352 of the outer portion 320 to a back edge 354 of the outer portion 320. It is contemplated that the side wall 325 could cover more or less of the fender-side portion 350.

The exact form of the fenders 100, 200, 300 could also vary, depending on the implementation. It is contemplated that different implementations could include additional aesthetic or function details, including, but not limited to, fins, corrugations, spoilers and ridges.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

What is claimed is:

1. A vehicle comprising:
   a frame;
   a vehicle body connected to the frame;
   a motor connected to the frame;
   a left suspension connected to a left side of the frame;
   a right suspension connected to a right side of the frame;
   a left footrest disposed on a left side of the vehicle body;
   a right footrest disposed on a right side of the vehicle body;
   a left wheel operatively connected to the left suspension;
   a right wheel operatively connected to the right suspension,
   each wheel having a rim and a tire mounted on the rim,
   the left wheel rotating about a left axis of rotation,
   the right wheel rotating about a right axis of rotation, both wheels being outside the vehicle body;
   a left fender disposed at least in part laterally between the vehicle body and the left wheel; and
   a right fender disposed at least in part laterally between the vehicle body and the right wheel, each fender comprising:
      an arcuate outer wall adapted for extending over at least a portion of an upper part of the tire of its corresponding wheel;
      a side wall having:
         an outer portion extending from an edge of the outer wall, the outer portion extending radially inward of the outer wall, the outer portion covering at least a portion of a sidewall of the tire on a vehicle facing side of its corresponding wheel, and
         an inner portion extending from the outer portion, the inner portion extending radially inward of the outer portion, the inner portion covering at least a portion of the rim of its corresponding wheel on the vehicle facing side; and
   a lower plate extending rearward from the outer wall, the lower plate being generally horizontal,
   an imaginary line drawn from a bottom of the left wheel to the left footrest passing through the lower plate of the left fender, and
   an imaginary line drawn from a bottom of the right wheel to the right footrest passing through the lower plate of the right fender.

2. The vehicle of claim 1, wherein the inner portion of the side wall of the left fender extends below the left axis of rotation and the inner portion of the side wall of the right fender extends below the right axis of rotation.

3. The vehicle of claim 1, wherein, for each fender, the outer wall covers at least a portion of a rear part of its corresponding tire.

4. The vehicle of claim 1, wherein each fender further comprises a splitter plate extending rearward from the outer wall, the splitter plate being generally vertical.

5. The vehicle of claim 1, wherein:
   the lower plate of the left fender further extends laterally rightward from the outer wall of the left fender; and
   the lower plate of the right fender further extends laterally leftward from the outer wall of the right fender.

6. The vehicle of claim 1, wherein:
   each of the left and right suspensions has a suspension arm;
   the inner portion of the side wall of each fender defines an aperture; and
   the suspension arm passes through the aperture.

7. The vehicle of claim 1, wherein:
   each of the left and right suspensions has a first suspension arm and a second suspension arm;
   the inner portion of the side wall of each fender defines a first aperture disposed above a corresponding one of the left and right axes of rotation and a second aperture disposed below the corresponding one of the left and right axes of rotation; and
   the first suspension arm passes through the first aperture and the second suspension arm passes through the second aperture.

8. The vehicle of claim 7, further comprising:
   a left steering arm operatively connected to the left spindle;
   a right steering arm operatively connected to the right spindle; and
   wherein:
      the inner portion of the side wall of each fender defines a steering aperture disposed in the inner portion of the side wall, and
      each steering arm passes through the steering aperture of the corresponding fender.

9. The vehicle of claim 7, wherein:
   the left fender is connected to the left spindle; and
   the right fender is connected to the right spindle.

10. The vehicle of claim 9, wherein:
    the side wall of the left fender is connected to the left spindle; and
    the side wall of the right fender is connected to the right spindle.

11. A fender for a vehicle wheel, the wheel having a rim and a tire mounted on the rim, the wheel having a vehicle facing side facing a vehicle when mounted to the vehicle, the fender comprising:
- an arcuate outer wall adapted for extending over at least a portion of an upper part of the tire;
- a side wall having:
  - an outer portion extending from an edge of the outer wall, the outer portion extending radially inward of the outer wall, the outer portion being generally perpendicular to the outer wall, the outer portion being adapted for covering at least a portion of a sidewall of the tire on the vehicle facing side, and
  - an inner portion extending from the outer portion, the inner portion extending radially inward of the outer portion, the inner portion being adapted for covering at least a portion of the rim on the vehicle facing side; and
- a lower plate extending rearward from the outer wall, the lower plate being generally perpendicular to the vehicle facing side of the outer portion of the side wall,
- the lower plate further extending laterally outward from the vehicle facing side of the outer portion of the side wall, and
- the lower plate being disposed below an axis of rotation of the wheel when the fender is mounted to the vehicle.

12. The fender of claim 11, further comprising a splitter plate extending rearward from the outer wall, the splitter plate being generally parallel to the outer portion of the side wall, the splitter plate being generally perpendicularly to the lower plate.

13. The fender of claim 12, wherein the splitter plate extends upwards from a lower edge of the outer wall.

14. The fender of claim 11, wherein the inner portion of the side wall defines at least one aperture adapted for receiving at least one suspension arm therethrough.

15. The fender of claim 11, further comprising a vertical fin extending upward from a top of the outer wall.

16. The fender of claim 15, further comprising at least one indicator light connected to the vertical fin.

17. A fender for a vehicle wheel, the wheel having a rim and a tire mounted on the rim, the wheel having a vehicle facing side facing a vehicle when mounted to the vehicle, the fender comprising:
- an arcuate outer wall adapted for extending over at least a portion of an upper part of the tire;
- a side wall extending from an edge of the outer wall, the side wall extending radially inward of the outer wall, the side wall being adapted for covering at least a portion of a sidewall of the tire on the vehicle facing side; and
- a lower plate extending rearward from the outer wall, the lower plate being generally perpendicular to a vehicle facing side of the side wall,
- the lower plate further extending laterally outward from the vehicle facing side of the side wall, and
- the lower plate being disposed below an axis of rotation of the wheel when the fender is mounted to the vehicle.

18. The fender of claim 17, wherein the lower plate extends from a bottom portion of the outer wall.

\* \* \* \* \*